United States Patent
Chen et al.

(10) Patent No.: US 7,216,349 B2
(45) Date of Patent: May 8, 2007

(54) SYSTEM AND METHOD FOR TRIGGERING MESSAGE QUEUE APPLICATIONS

(75) Inventors: Shawfu Chen, New Milford, CT (US); Robert O. Dryfoos, Hopewell Junction, NY (US); Allan Feldman, Poughkeepsie, NY (US); Ric C. Hung, Wappingers Falls, NY (US); John M. Tarby, Sherman, CT (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 10/164,127

(22) Filed: Jun. 5, 2002

(65) Prior Publication Data

US 2003/0229725 A1    Dec. 11, 2003

(51) Int. Cl.
*G06F 13/00* (2006.01)

(52) U.S. Cl. ............ 719/314; 719/310; 719/313; 718/100

(58) Field of Classification Search ........... 719/314, 719/310, 313, 318; 718/100, 102
See application file for complete search history.

(56) References Cited

U.S. PATENT DOCUMENTS

| | | | | |
|---|---|---|---|---|
| 5,430,875 A | | 7/1995 | Ma ........................... | 395/650 |
| 5,530,848 A | | 6/1996 | Gilbert et al. .............. | 395/600 |
| 5,848,234 A | | 12/1998 | Chernick et al. ........ | 395/200.33 |
| 6,014,710 A | * | 1/2000 | Talluri et al. .............. | 709/237 |
| 6,058,389 A | | 5/2000 | Chandra et al. ............. | 707/1 |
| 6,141,701 A | * | 10/2000 | Whitney ..................... | 710/5 |
| 6,163,812 A | | 12/2000 | Gopal et al. ............... | 709/310 |
| 6,189,047 B1 | | 2/2001 | Ball ........................... | 709/318 |
| 6,289,392 B1 | | 9/2001 | Bugbee ....................... | 709/313 |
| 6,425,017 B1 | * | 7/2002 | Dievendorff et al. ....... | 719/315 |
| 6,615,215 B1 | * | 9/2003 | Petty .......................... | 707/101 |
| 6,901,594 B1 | * | 5/2005 | Cain et al. .................. | 719/310 |

OTHER PUBLICATIONS

"MQSeries Techniques" http://www.fiendish.demon.co.uk/MQSeries/techniques.html; Copyright Robert Quince 1998.
"MQTrgMon MQSeries Trigger Monitor" http://www.pmeconsulting.com/it/services/software/mqseries/mqtrgmon.php PME Consulting (Pty) Ltd.; Copyright 1999, 2000.
"MQSeries: Message Oriented Middleware" http://www-4.ibm.com/software/ts/mqseries/library/whitepapers/mqover/.
"Systems Management" http://www.messageq.com/systems_mangement/mqssminstr.html.; Copyright 1998 NASG, Inc.
"MQControl" http://www.nastel.com/products/product_htm.; Copyright 1996-2001 Nastel Technologies, Inc.
"What you need to know about Messaging" http://www.globalmidrange.com/sw/mqseries2.htm; Copyright 1999-2001 Global Midrange Technologies, Inc.
"Triggering MQSeries Channels in Distributed Systems" by Wayne Bucek; Technical Support Magazine; Nov. 1997.

* cited by examiner

Primary Examiner—William Thomson
Assistant Examiner—Andy Ho
(74) Attorney, Agent, or Firm—Cantor Colburn LLP

(57) ABSTRACT

A method for triggering message queue applications, comprising performing a first trigger process, the first trigger process including: a first application evaluating a queue for a trigger message; the first application determining whether a second trigger process is already being performed for the queue; and the first application invoking a second application where the invoking is in response to the trigger message.

24 Claims, 3 Drawing Sheets

SYSTEM AND METHOD FOR TRIGGERING MESSAGE QUEUE APPLICATIONS

BACKGROUND

The need for communications among computer systems is spurring advancement in several key technology areas including networking and messaging. As technology industries grow, the number and type of available computer systems grows in proportion. Parallel development of a multitude of computer system standards, platforms, and operating systems poses challenges to inter-system communications. Until recently, sophisticated and often expensive conversion programs were needed to achieve inter-communicability. However, the advent of messaging and queueing systems has made communications across distributed and often disparate systems a viable and economical reality.

Messaging software provides an interface between applications, allowing them to send data back and forth to each other asynchronously. Data sent by one is stored in a queue and then retrieved by a receiving program when the receiving program becomes available to process the message. In accordance with message queueing implementations such as IBM Websphere MQseries®, a messaging application known as a queue manager interprets certain events or conditions as indicating that an action or response is warranted. Such an event or condition is known as a trigger event. When a trigger event occurs, the queue manager sends a trigger message to a second queue referred to as an initiation queue indicating that a trigger event has occurred. A trigger message can be generated for a queue every time a message arrives on the queue, when the first message arrives on the queue, or when the number of messages on the queue reaches a predefined number. A first application can request that the placement of any message on a local queue associated with the first application be interpreted as a trigger event. Generally, a trigger message indicates that a trigger event occurred and may also include additional information related to the trigger event. A second messaging application known as a trigger manager monitors the initiation queue, retrieves trigger messages placed on the initiation queue, creates a task (invokes a second application), and passes the trigger messages to the second application.

A consequence of such an architecture is that where the trigger manager is not executing, the second application is not invoked and trigger messages are not received by the second application. In addition, the time required to complete the entire trigger process for multiple triggers is extended where trigger messages are placed on the initiation queue faster than the trigger manager is able to retrieve them and pass them to the second application. Such is the case in high performance systems and high transaction-rate systems. An embodiment of the present invention provides for an efficient system and method for message queue triggering.

SUMMARY OF THE INVENTION

A method for triggering message queue applications, comprising performing a first trigger process, the first trigger process including: a first application evaluating a queue for a trigger message; the first application determining whether a second trigger process is already being performed for the queue; and the first application invoking a second application where the invoking is in response to the trigger message.

DETAILED EMBODIMENT

For purposes of example and explanation, the exemplary embodiments contained herein are implemented using IBM's MQSeries messaging/queueing systems. An embodiment of the present invention may be implemented using any messaging/queueing system without exceeding the scope of the present disclosure. An exemplary embodiment of the present invention provides for the creation and activation of a task application in response to a trigger event without requiring an initiation queue or a trigger manager application.

In an exemplary embodiment, the queue manager places a trigger message on the queue and invokes a second application in response to the trigger message. The invoking of the second application may be performed by an application other than the queue manager without exceeding the scope of the present disclosure.

Figure 1:
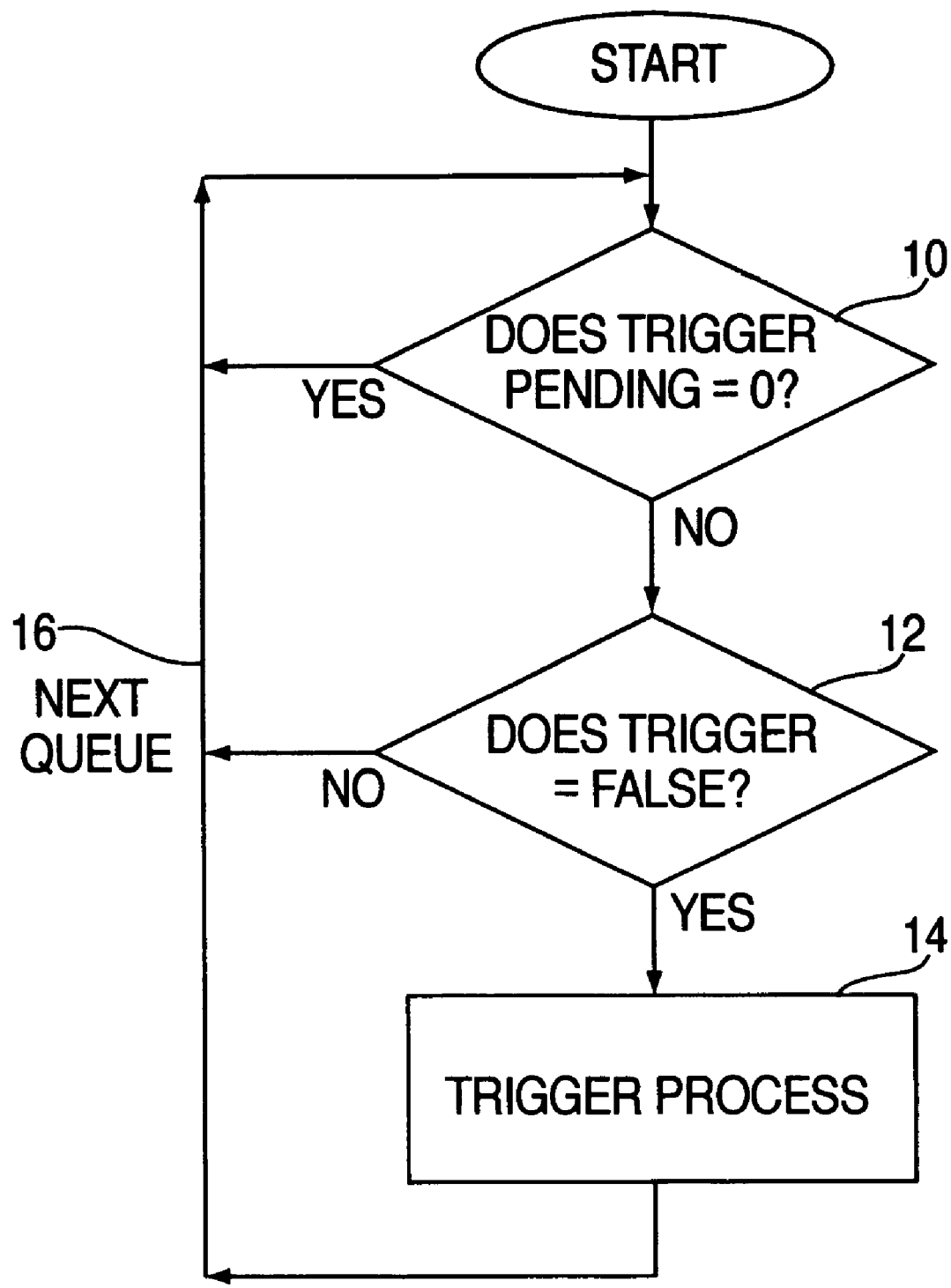
FIG. 1 is a flow chart of exemplary steps for initiating a trigger process for a queue.

FIG. 1 is a flow chart of exemplary steps for initiating a trigger process for a queue. The exemplary steps of FIG. 1 are repeated for each local or local transmission queue known to the queue manager. Moreover, the exemplary steps of FIG. 1 are repeated for each local or local transmission queue and are repeated on either a random or fixed frequency basis. The queue manager determines whether there is a pending trigger for a queue at 10. If there is a pending trigger for the queue, the queue manager returns to step 10 via line 16 and step 10 is executed for another queue. If there is no pending trigger for the queue, the queue manager increments the trigger pending counter and continues to step 12.

The queue manager determines whether there is currently a trigger for the queue at step 12. If there is currently a trigger for the queue, the queue manager returns to step 10 via line 16 and step 10 is executed for another queue. If there is not currently a trigger for the queue, the queue manager continues to step 14.

The queue manager completes the trigger for the queue at 14. Upon completion of the trigger at step 14, the queue manager returns to step 10 via line 16 and step 10 is executed for another queue. A queue manager may comprise one or more concurrent executing processes and in addition that multiple instances of the queue manager may execute concurrently on one or more computer systems.

For purposes of clarity and explanation, "in-parallel" or "concurrent" computer applications, programs, tasks, operations, and/or processes refers to the concurrent execution of two or more of the same. The concurrency may be synchronous or asynchronous and that computer applications, programs, tasks, operations, and/or processes may initiate, execute, and terminate independent of one another.

Furthermore, an executing computer application, program, task, operation, and/or process may be referred to as an instance of the same. For example, where a computer system executes computer code comprising the exemplary queue manager described in the embodiments herein, it is understood that one instance of the queue manager is executing on the computer system. Likewise, where a computer system is enabled with a single processor capable of concurrently executing computer code for more than one process or where a computer system is enabled with multiple processors, it is understood that each concurrently executing stream of computer code is an instance. For example, where a computer system is enabled with four processors and each processor is enabled to concurrently execute four streams of computer code comprising the exemplary queue manager described in the embodiments herein, it is understood that sixteen instances of the queue manager are concurrently executing on the computer system.

Figure 2:
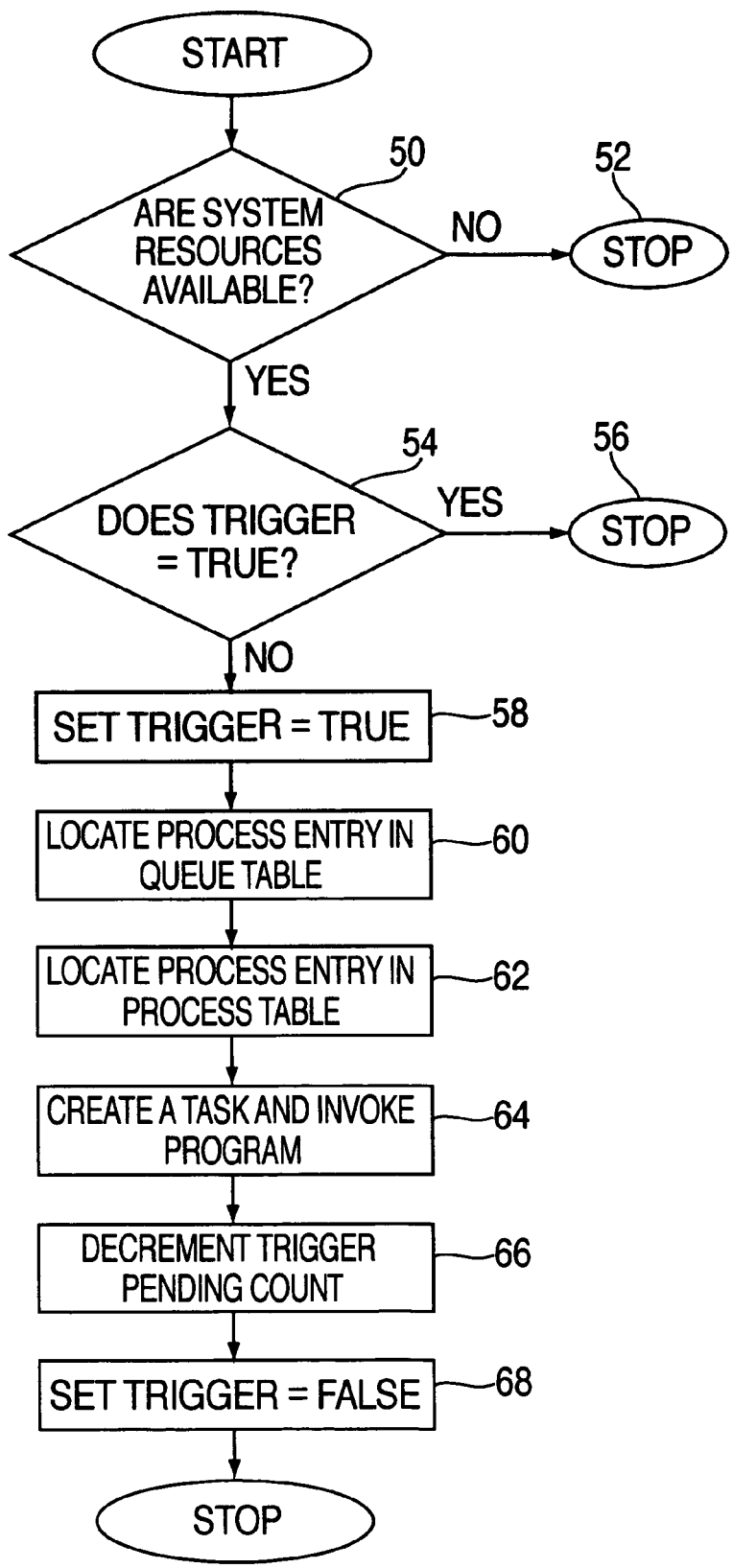
FIG. 2 is a flow chart showing the trigger process of FIG. 1.

FIG. 2 is a flow chart showing the trigger process of step 14 of FIG. 1. The exemplary steps of FIG. 2 are repeated for a queue each time the queue manager initiates a trigger process. The queue manager determines whether there are sufficient system resources available for creating a new task at 50. If sufficient system resources are not available, the queue manager stops the trigger at 52. If there are sufficient system resources, the queue manager continues to step 54.

The queue manager determines whether there is a second trigger process executing for the queue at 54. If there is another trigger process for the queue already executing, the queue manager stops the current trigger process at 56. If there is not another trigger process executing for the queue, the queue manager continues to step 58.

The queue manager sets an indicator to indicate that the there is now a trigger in process for the queue at 58. This indicator may, for example, be a variable having a true or false value. The queue manager uses a queue identifier to locate a corresponding process entry in a queue table at step 60. The queue manager searches a process table using the located process entry to select a second application associated with the queue at 62. The process entry is referred to as a definition object and contains information about a task or application to be started by the queue manager in response to the trigger event. When the queue manager generates the trigger message it reads the information in the process definition object and places it in the trigger message. The queue manager initiates a new task and invokes the second application at 64. The queue manager decrements a pending trigger counter to indicate the completion of the current trigger process at 66. The queue manager sets an indicator indicating that there is not currently a trigger in process for the queue at 68.

Figure 3:
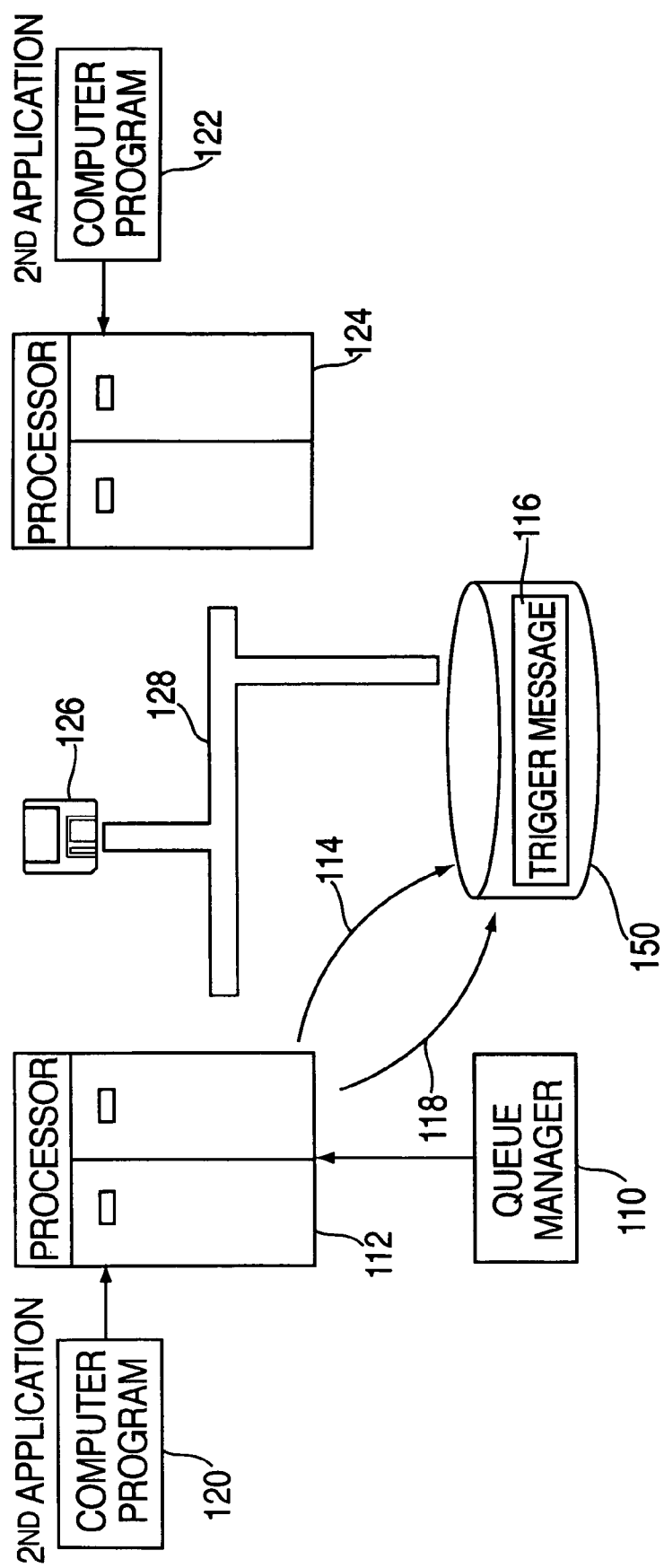
FIG. 3 shows an exemplary system for triggering message queue applications.

FIG. 3 shows an exemplary system for triggering message queue applications. A queue manager 110 is executed as a task application by a processor 112. The queue manager 110 places a trigger message 116 on queue 150 via line 114. The queue manager 110 determines that there is a pending trigger message 116 via line 118. The queue manager 110 determines what action should be taken in response to the trigger message 116 using the queue and processor tables as described for FIG. 2. The queue manager 110 creates a new task and invokes a second application. In a first example, the second application 120 is executed by the same processor 112 that executes the queue manager 110. In an alternative example, the second application 122 is executed by a separate processor 124 from the processor 112 that executes the queue manager 110. In an exemplary embodiment, computer program code for triggering message queue applications is located in a computer usable storage medium 126 that is in communication with and accessible by at least one computer/processor 112, 124 via a propagated data communication signal 128.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A computer implemented method for triggering message queue applications, comprising performing a first trigger process, said first trigger process including:
   a first application evaluating a queue for a trigger event;
   said first application determining whether a second trigger process is already being performed for said queue;
   said first application creating a trigger message in response to said trigger event; and
   said first application invoking a second application if said second trigger process is not already being performed, said invoking in response to said trigger message, said second application for processing said trigger message and for initiating a task associated with said trigger message.

2. A method as in claim 1 wherein selection of said second application is performed using a queue table associating a queue identifier to a corresponding process entry and a process table associating process entries to applications, said selection including accessing said queue table to obtain process entry and accessing said process table to obtain said second application in response to said process entry.

3. A method as in claim 1 wherein said determining further comprises evaluating a value of a variable, said value being equal to true if a second trigger process is already being performed for said queue, said value being equal to false if a second trigger process is not being performed for said queue.

4. A method as in claim 3 wherein said invoking is performed if the value of said variable is equal to false.

5. A method as in claim 3 further comprising performing the following steps:
   setting said variable equal to true prior to said invoking;
   setting said variable equal to false subsequent to said invoking; and
   decrementing a counter in response to said completion of said invoking.

6. A method as in claim 1 wherein said first trigger process is performed for said queue if a counter corresponding to said queue is equal to a value greater than one, said counter indicating the number of pending trigger messages on said queue.

7. A method as in claim 6 further wherein said first trigger process is performed for said queue if a true/false value of a variable is equal to false, said value being equal to true if a second trigger process is being performed for said queue, said value being equal to false if a second trigger process is being performed for said queue.

8. A method as in claim 1 wherein more than one instance of said first trigger process is executing concurrently.

9. A method as in claim 8 wherein one or more of said instances executes in separate task applications.

10. A method as in claim 8 wherein said instances are executed by separate processors.

11. A computer-implemented system for triggering message queue applications, comprising:
    at least one queue manager, said queue manager including computer program code for triggering message queue applications, comprising performing a first trigger process, said first trigger process including:
    a first application evaluating a queue for a trigger event;
    said first application determining whether a second trigger process is already being performed for said queue;
    said first application creating a trigger message in response to said trigger event; and
    said first application invoking a second application if said second trigger process is not already being performed, said invoking in response to said trigger message, said second application for processing said trigger message and for initiating a task associated with said trigger message.

12. A system as in claim 11 wherein selection of said second application is performed using a queue table associating a queue identifier to a corresponding process entry and a process table associating process entries to applications, said selection including accessing said queue table to obtain process entry and accessing said process table to obtain said second application in response to said process entry.

13. A system as in claim 11 wherein said determining further comprises evaluating a value of a variable, said value being equal to true if a second trigger process is already being performed for said queue, said value being equal to false if a second trigger process is not being performed for said queue.

14. A system as in claim 13 wherein said invoking is performed if the value of said variable is equal to false.

15. A system as in claim 13 further comprising performing the following steps:
    setting said variable equal to true prior to said invoking;
    setting said variable equal to false subsequent to said invoking; and
    decrementing a counter in response to said completion of said invoking.

16. A system as in claim 11 wherein said first trigger process is performed for said queue if a counter corresponding to said queue is equal to a value greater than one, said counter indicating the number of pending trigger messages on said queue.

17. A system as in claim 16 further wherein said first trigger process is performed for said queue if a true/false value of a variable is equal to false, said value being equal to true if a second trigger process is being performed for said queue, said value being equal to false if a second trigger process is being performed for said queue.

18. A system as in claim 11 wherein more than one instance of said first trigger process is executing concurrently.

19. A system as in claim 18 wherein one or more of said instances executes in separate task applications.

20. A system as in claim 18 wherein said instances are executed by separate processors.

21. An article of manufacture comprising a computer usable medium having computer readable program code for triggering message queue applications, said computer readable program code comprising computer readable program code for:
    performing a first trigger process, said first trigger process including:
    a first application evaluating a queue for a trigger event;
    said first application determining whether a second trigger process is already being performed for said queue;
    said first application creating a trigger message in response to said trigger event; and
    said first application invoking a second application if said second trigger process is not already being performed, said invoking in response to said trigger message, said second application for processing said trigger message and for initiating a task associated with said trigger message.

22. An article of manufacture as in claim 21 wherein said determining further comprises evaluating a value of a variable, said value being equal to true if a second trigger process is already being performed for said queue, said value being equal to false if a second trigger process is not being performed for said queue.

23. An article of manufacture as in claim 22 wherein said invoking is performed if the value of said variable is equal to false.

24. An article of manufacture as in claim 22 wherein said computer readable program code further comprises computer readable program code for performing the following steps:
    setting said variable equal to true prior to said invoking;
    setting said variable equal to false subsequent to said invoking; and
    decrementing a counter in response to said completion of said invoking.

* * * * *